(12) United States Patent
Ishikawa et al.

(10) Patent No.: US 6,752,735 B2
(45) Date of Patent: Jun. 22, 2004

(54) TOROIDAL-TYPE CONTINUOUSLY VARIABLE TRANSMISSION

(75) Inventors: Kouji Ishikawa, Kanagawa (JP); Masami Tanaka, Kanagawa (JP); Takashi Imanishi, Kanagawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/987,375

(22) Filed: Nov. 14, 2001

(65) Prior Publication Data

US 2002/0058562 A1 May 16, 2002

(30) Foreign Application Priority Data

Nov. 15, 2000 (JP) .................................... P. 2000-348206

(51) Int. Cl.[7] ......................... F16H 37/02; F16H 15/38
(52) U.S. Cl. ...................................... 475/216; 476/40
(58) Field of Search ........................ 476/8, 40, 42; 475/209, 214, 215, 216, 217

(56) References Cited

U.S. PATENT DOCUMENTS

| | | | |
|---|---|---|---|
| 6,030,311 A | * 2/2000 | Osumi ......................... | 476/42 |
| 6,171,210 B1 | 1/2001 | Miyata et al. .............. | 475/216 |
| 6,203,466 B1 | * 3/2001 | Ishikawa et al. ............. | 475/216 |
| 6,244,985 B1 | * 6/2001 | Wafzig et al. ................. | 476/42 |

FOREIGN PATENT DOCUMENTS

| | | | | |
|---|---|---|---|---|
| DE | 198 21 417 | | 11/1999 | ........... F16H/15/38 |
| JP | 5-57494 | | 7/1993 | ........... F16H/15/38 |
| JP | 407293653 | * | 11/1995 | ................... 476/40 |
| JP | 2629786 | | 4/1997 | ........... F16H/15/38 |
| JP | 02000213612 | * | 8/2000 | ................... 476/40 |
| JP | 2000-9196 | | 11/2000 | ........... F16H/15/38 |

* cited by examiner

*Primary Examiner*—Roger Pang
(74) *Attorney, Agent, or Firm*—Sughrue Mion, PLLC

(57) ABSTRACT

A toroidal-type continuously variable transmission, includes: an input shaft; a pair of mutually opposed input and output disks disposed side-by-side in an axial direction of the input shaft; a pressing mechanism pressing said input disk toward said output disk; a hollow shaft disposed around an outer periphery of the input shaft concentrically with the input shaft, and connecting the pair of input disks to each other; an oil hole formed in a no-penetrating portion of the input shaft where the input shaft does not penetrate through the hollow shaft, and opened on an outer peripheral surface of the no-penetrating portion; and, an oil passage formed between an inner peripheral surface of the hollow shaft and an outer peripheral surface of a penetrating portion of the input shaft where the input shaft penetrates through the hollow shaft.

5 Claims, 5 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission and a continuously variable transmission apparatus for use in a power transmission system of a vehicle.

2. Description of the Related Art

Conventionally, in a power transmission system of a vehicle, there is used a toroidal-type continuously variable transmission of a double cavity type. The toroidal-type continuously variable transmission of a double cavity type, for example, as disclosed in JP-A-2000-9196 or in Japanese Patent No. 2629786, includes a pair of input disks, a pair of output disks, a plurality of power rollers, a pressing device and an output gear. The pair of input disks' are disposed in such a manner as to be spaced from each other in the axial direction of an input shaft. The pair of output disks are interposed between the two input disks and opposed to their associated input disks. The plurality of power rollers are interposed between the mutually opposed input and output disks. The pressing device presses the input disk toward the output disk. The output gear rotates integrally with the output disks.

Further, there has been developed a continuously variable transmission apparatus which is a combination of a toroidal-type continuously variable transmission using a loading cam with a planetary gear mechanism. For example, there is known a continuously variable transmission apparatus, in which a toroidal-type continuously variable transmission and a planetary gear mechanism are disposed substantially concentrically with an engine shaft, and power is circulated between the input shaft and the output gear of the toroidal-type continuously variable transmission. And, the planetary gear mechanism includes a clutch capable of switching a low speed mode, a high speed mod, and a retreating mode over one another. In this type of continuously variable transmission apparatus, for example, as shown in DE19821417A1, in order to prevent a pressing force by the loading cam from increasing excessively, a hollow shaft is disposed on the outer periphery side of the input shaft in such a manner as to be concentric with the input shaft, and first and second input disks are connected to each other by the hollow shaft, whereby torque transmitted from the input shaft can be distributed to the pair of input disks.

In a toroidal-type continuously variable transmission, it is important to supply a sufficient quantity of lubricating oil to the portions of the toroidal-type continuously variable transmission to be lubricated, for example, bearings and ball splines. For example, as disclosed in JP-A-2000-9196, in order to lubricate bearings or ball splines for supporting disks or gears, an oil passage is formed in the interior of an input shaft, and a hole which communicates with the oil passage is opened up in the vicinity of the bearings or ball splines.

However, the above described toroidal-type continuously variable transmission structured such that the input shaft penetrates through the hollow shaft restricts the outside diameter of the penetrating portion of the input shaft, where the input shaft penetrates through the hollow shaft. Therefore, there arises a problem that, when an oil hole is formed in the input shaft, there occurs an excessive stress in the periphery of the oil hole. In order to lower the level of the stress, it is effective to increase the sizes of the parts of the toroidal-type continuously variable transmission. However, this raises another problem that the whole size of the toroidal-type continuously variable transmission is increased and thus the weight thereof is also increased.

Especially, a tensile load from the loading cam and a torsional load due to the engine torque are applied to the input shaft at the same time. Also, since stresses concentrate in the vicinity of the oil hole, there is generated an excessive stress. In particular, in the portion where the input shaft penetrates through the hollow shaft, the outside diameter of the input shaft is limited according to the inside diameter of the hollow shaft and thus the shaft diameter thereof is reduced, thereby raising the level of the stress. This makes it more difficult to form an oil hole in the input shaft. Even in case where the hardness of the periphery of the oil hole was increased by heat treatment, the strength of the oil hole could not be increased so much due to the existence of an abnormal layer caused by heat treatment By the way, as disclosed in Japanese Patent No. 2629786, there is proposed a structure that a clearance between the input shaft and hollow shaft is used as a lubricating oil passage. However, in this structure, of the whole length of the input shaft, the oil hole is formed in the portion (the portion where the shaft diameter is small) of the input shaft that penetrates through the hollow shaft; and, therefore, there is a possibility that the input shaft can be damaged by the excessive stress concentration.

SUMMARY OF THE INVENTION

The present invention aims at eliminating the above drawbacks found in the conventional toroidal-type continuously variable transmissions. Accordingly, it is an object of the invention to provide a toroidal-type continuously variable transmission which can provide excellent lubricating performance without lowering the strength of the input shaft.

To attain the above object, according to the present invention, there is provided a toroidal-type continuously variable transmission, including: an input shaft transmitting power from an engine; a pair of input disks disposed in such a manner as to be spaced apart from each other in an axial direction of the input shaft; a pair of output disks interposed between the pair of input disks in such a manner as to be opposed to the respective input disks; a pressing mechanism pressing the input disk toward the output disk; and, a hollow shaft disposed around an outer periphery of the input shaft concentrically with the input shaft, and connecting the pair of input disks to each other. The input shaft defines an oil hole formed in a no-penetrating portion of the input shaft where the input shaft does not penetrate through the hollow shaft, and opened on an outer peripheral surface of the no-penetrating portion. An oil passage is formed between an inner peripheral surface of the hollow shaft and an outer peripheral surface of a penetrating portion of the input shaft where the input shaft penetrates through the hollow shaft.

Further, according to the present invention, there is provided a continuously variable transmission apparatus including a combination of a toroidal-type continuously variable transmission with a planetary gear mechanism, the toroidal-type continuously variable transmission having: an input shaft transmitting power from an engine; a pair of input disks disposed in such a manner as to be spaced apart from each other in an axial direction of the input shaft; a pair of output disks interposed between the pair of input disks in such a manner as to be opposed to the respective input disks;

a pressing mechanism pressing the input disk toward the output disk; and, a hollow shaft disposed around an outer periphery of the input shaft concentrically with the input shaft, and connecting the pair of input disks to each other. The input shaft defines an oil hole formed in a no-penetrating portion of the input shaft where the input shaft does not penetrate through the hollow shaft, and opened on an outer peripheral surface of the no-penetrating portion. An oil passage is formed between an inner peripheral surface of the hollow shaft and an outer peripheral surface of a penetrating portion of the input shaft where the input shaft penetrates through the hollow shaft. And, the planetary gear mechanism has: a first rotary body rotatable by the input shaft; a second rotary body rotatable by the output disk; and, a clutch switching over the rotation movements of the first and second rotary bodies to any of an advancing side high speed mode, an advancing side low speed mode and a retreating mode to transmit the same to the output shaft.

Moreover, according to the present invention, there is also provided a continuously variable transmission apparatus including a combination of a toroidal-type continuously variable transmission with a planetary gear mechanism, the toroidal-type continuously variable transmission having: an input shaft transmitting power from an engine; an output shaft disposed in parallel to the input shaft; a pair of input disks disposed in such a manner as to be spaced apart from each other in an axial direction of the input shaft; a pair of output disks interposed between the pair of input disks in such a manner as to be opposed to the respective input disks; a pressing mechanism pressing the input disk toward the output disk; and, a hollow shaft disposed around an outer periphery of the input shaft concentrically with the input shaft, and connecting the pair of input disks to each other. The input shaft defines an oil hole formed in a no-penetrating portion of the input shaft where the input shaft does not penetrate through the hollow shaft, and opened on an outer peripheral surface of the no-penetrating portion. An oil passage is formed between an inner peripheral surface of the hollow shaft and an outer peripheral surface of a penetrating portion of the input shaft where the input shaft penetrates through the hollow shaft. And, the planetary gear mechanism has: a linking member rotatable integrally with the input shaft; a first rotary body rotatable integrally with the linking member; a second rotary body rotatable by the output disk; and, a clutch for switching over the rotation movements of the first and second rotary bodies to any of an advancing side high speed mode, an advancing side low speed mode and a retreating mode to transmit the same to the output shaft.

According to the invention, in the input shaft to which a tensile load and a torsional load are applied, no oil hole is formed in the penetrating portion thereof where the input shaft penetrates through the hollow shaft but an oil hole is formed in the no-penetrating portion thereof where the input shaft does penetrate through the hollow shaft. Therefore, a stress in the periphery of the oil hole can be reduced. Also, since the shaft diameter of the oil hole forming portion (that is, the portion of the input shaft where the input shaft does not penetrate through the hollow shaft) can be set larger than that of the portion of the input shaft where the input shaft penetrates through the hollow shaft, even in case where the oil hole is formed in the oil hole forming portion of the input shaft, there can be eliminated a fear that there can occur excessive stress concentration. On the other hand, in the case of the hollow shaft, a tensile load is hardly applied to the hollow shaft but the hollow shaft is simply required to transmit torque therethrough; and, the torque to be transmitted through the hollow shaft is at most about half of the engine torque. Therefore, even in case where an oil flow hole is formed in the hollow shaft, there is no possibility that an excessive stress can be generated.

According to the invention, a groove may be formed in the outer peripheral surface of the input shaft to thereby facilitate the flow of the lubricating oil. This groove may be a linear-shaped groove extending along the axial direction of the input shaft, or a spiral-shaped groove, or may be composed of a plurality of grooves.

Preferably, there may be employed a spiral groove drawing a spiral which, in consideration of the direction of the torsion moment applied to the input shaft, extends in the opposite direction to the rotation direction of the input shaft from the torque inputting side end portion of the input shaft toward the torque transmitting side end portion of the input shaft. That is, by forming the spiral groove in the direction where the tensile stress acts, the strength of the input shaft can be further enhanced.

By the way, the invention can also be applied to such a continuously variable transmission apparatus as disclosed in Japanese Patent No. 2629786, in which the torque transmitted from the engine shaft is transmitted only to a toroidal-type continuously variable transmission. Also, the invention can also be applied to a continuously variable transmission apparatus of a so called geared neutral type which is constructed by a combination of a toroidal-type continuously variable transmission and a planetary gear mechanism.

DETAILED DESCRIPTION OF THE PREFERRED EMBODIMENTS

Figure 1:
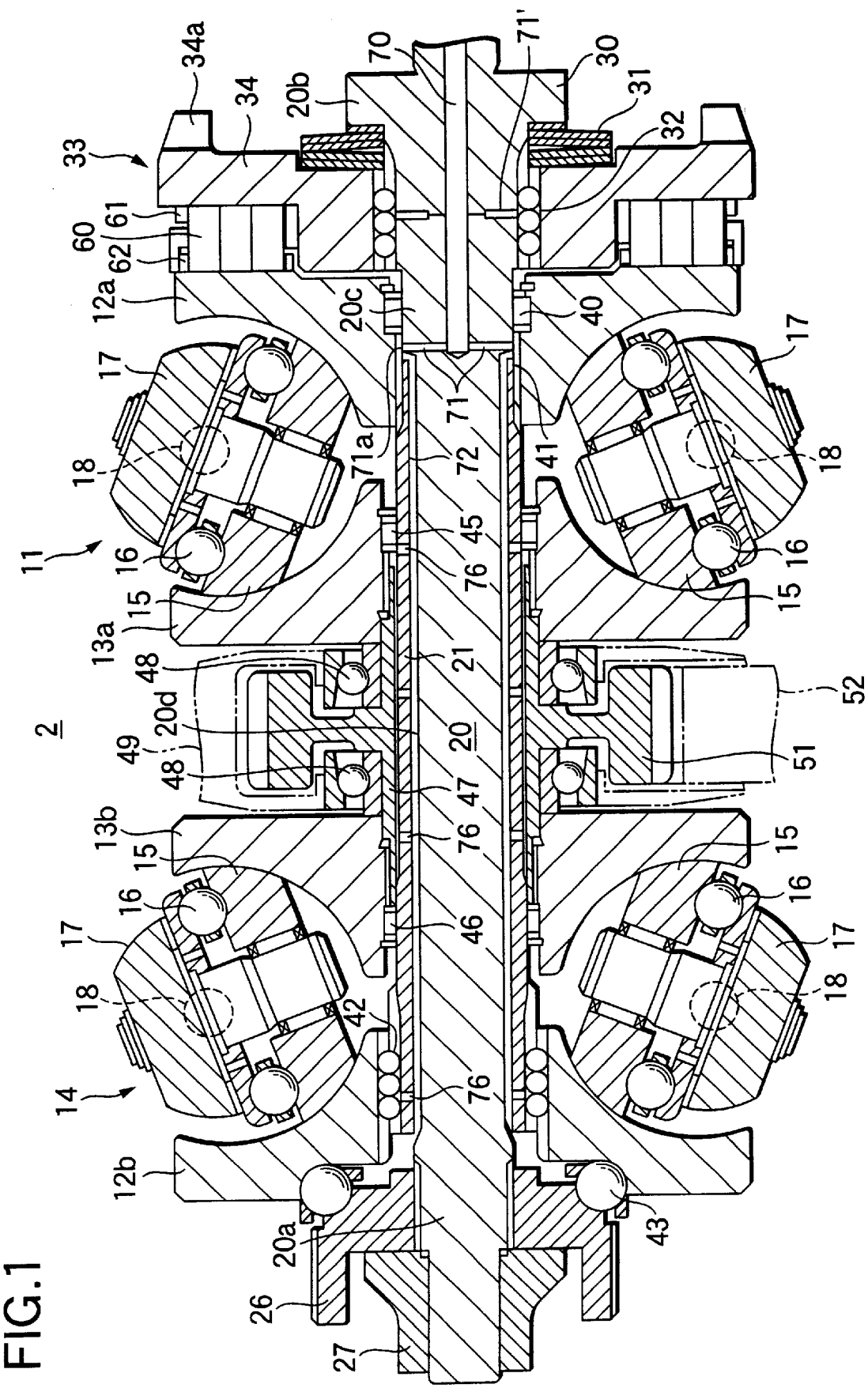
FIG. 1 is a section view of a toroidal-type continuously variable transmission according to a first embodiment of the invention, taken along the axial direction thereof.

Now, a description will be given below of a continuously variable transmission apparatus including a half-toroidal-type continuously variable transmission according to a first embodiment of the invention with reference to FIGS. 1 to 3. A continuously variable transmission apparatus 1 shown in FIG. 2 is constructed by a combination of a half-toroidal-type continuously variable transmission 2 of a double-cavity-type with a planetary gear mechanism 3.

Firstly, a description will be given below of the half-toroidal-type continuously variable transmission 2 of a double-cavity-type. The half-toroidal-type continuously variable transmission 2 shown in FIG. 1 includes a first input disk 12a and a first output disk 13a forming a first cavity 11, and a second input disk 12b and a second output disk 13b forming a second cavity 14. Between the first input and output disks 12a and 13a, there are interposed a pair of power rollers 15. The outer peripheral surfaces of the power rollers 15 are contacted with the traction surfaces of the first input and output disks 12a and 13a.

Similarly, a pair of power rollers 15 are interposed between the second input and output disks 12b and 13b. The outer peripheral surfaces of the power rollers 15 are contacted with the traction surfaces of the second input and output disks 12b and 13b. The power rollers 15 are rotatably mounted on their associated trunnions is disposed a cam disk 34 of a loading cam mechanism 33 which functions as a pressing mechanism according to the invention. This cam disk 34 is supported on the input shaft 20 in such a manner that it can be moved with respect to the input shaft 20 in the axial direction of the input shaft 20 and also that it is prevented from rotating with respect to the input shaft 20 by the ball spline 32. Therefore, the cam disk 34 can be rotated integrally with the input shaft 20.

The first input disk 12a is disposed in such a manner that it can be rotated with respect to the input shaft around the axis of the input shaft 20 by a bearing 40. Also, the input disk 12a is connected to one end portion of the hollow shaft 21 by a spline portion 41. Therefore, the first input disk 12a can be rotated integral with the hollow shaft 21.

The second input disk 12b is disposed on the other end portion of the hollow shaft 21 in such a manner that it can be moved with respect to the hollow shaft 21 in the axial direction of the hollow shaft 21 but it is prevented from rotating with respect to the hollow shaft 21 by a ball spline 42. Also, the input disk 12b is supported in such a manner that it can be rotated with respect to the drive member 26 by a bearing 43.

The output disks 13a, 13b are respectively interposed between the input disks 12a, 12b. And, the output disks 17 by power roller bearings 16, respectively. The trunnions 17 can be respectively swung about their associated trunnion shafts 18.

This toroidal-type continuously variable transmission 2 includes an input shaft (CVT shaft) 20 penetrating through the central portions of the respective disks 12a, 12b, 13a and 13b, and a hollow shaft 21 disposed on the outer periphery side of the input shaft 20 in such a manner that it is concentric with the input shaft 20. Between the outer peripheral surface of the input shaft 20 and the inner peripheral surface of the hollow shaft 21, there is formed an oil passage 72 which will be discussed later.

On one end side of the input shaft 20, that is, on the end portion 20a thereof where torque is input, there is disposed a drive member 26 which can be rotationally driven by an engine 25 (shown in FIG. 2). The drive member 26 is fixed to the input shaft 20 by a nut 27. Between the input shaft 20 and engine 25, there is interposed a clutch mechanism 28 such as a torque converter or an electromagnetic clutch. On the other end side of the input shaft 20, that is, on the end portion 20b thereof where the torque is transmitted, there are disposed a flange portion 30, a coned disk spring 31, and a ball spline 32.

On the end portion 20b of the input shaft 20, there 13a, 13b are respectively supported by their associated bearings 45, 46 in such a manner that they can be rotated with respect to the hollow shaft 21. The first output disk 13a is disposed opposed to the first input disk 12a, while the second output disk 13b is disposed opposed to the second input disk 12b. The output disks 13a, 13b are connected to each other by a connecting member 47 and they can be rotated in synchronization with each other. The connecting member 47 is supported on a portion 49 of a transmission case by bearings 48. Therefore, the output disks 13a, 13b and the connecting member 47 can be rotated around the hollow shaft 21.

An output gear 51 is disposed on the connecting member 47. A first relay gear 52 is in meshing engagement with the output gear 51. The first relay gear 52 is mounted on one end portion of a relay shaft 53 (shown in FIG. 2) which extends in parallel to the input shaft 20. The relay shaft 53 is structured such that it can be rotated only in one direction by a one-way clutch 54. On the other end portion of the relay shaft 53, there is disposed a second relay gear 55.

The loading cam mechanism 33 includes the cam disk 34 and a roller 60. Cam surfaces 61, 62 are respectively formed on the mutually opposed portions of the cam disk 34 and input disk 12a, while the roller 60 is held by and between the cam surfaces 61, 62. When the input shaft 20 is rotated while the roller 60 is held by and between the cam surfaces 61, 62, the cam disk 34 is rotated, so that the first input disk 12a is pushed toward the first output disk 13a and further, the first input disk 12a is rotated integral with the cam disk 34.

Also, since a reaction force received by the cam disk 34 is transmitted through the input shaft 20 and drive member 26 to the second input disk 12b, the second input disk 12b is pushed toward the second output disk 13b. Therefore, the input shaft 20 is subjected to not only a torsional load corresponding to the torque of the engine 25 but also a tensile load corresponding to such torque. An engaging portion 34a is formed on the opposite side of the cam surface 61 of the cam disk 34, while a linking member 63 (shown in FIG. 2) is engaged with the engaging portion 34a of the cam disk 34. The linking member 63 can be rotated integral with the cam disk 34.

In the thus structured toroidal-type continuously variable transmission 2 of a double cavity type, part of the torque of the engine 25 transmitted from the input shaft 20 to the cam disk 34 rotates the first output disk 13a through the first input disk 12a and power roller 15, while the remaining torque is input through the hollow shaft 21 into the second input disk 12b to thereby rotate the second output disk 13b through the power roller 15.

The rotations of the output disks 13a, 13b are transmitted to the relay shaft 53 through the output gear 51 and relay gear 52. Also, by changing the inclination angle of the power roller 15 between the first input and output disks 12a, 13a and the inclination angle of the power roller 15 between the second input and output disks 12b, 13b in synchronization with each other, the gear change ratio of the output disks 13, 13b to the input disks 12a, 12b can be changed.

Figure 2:
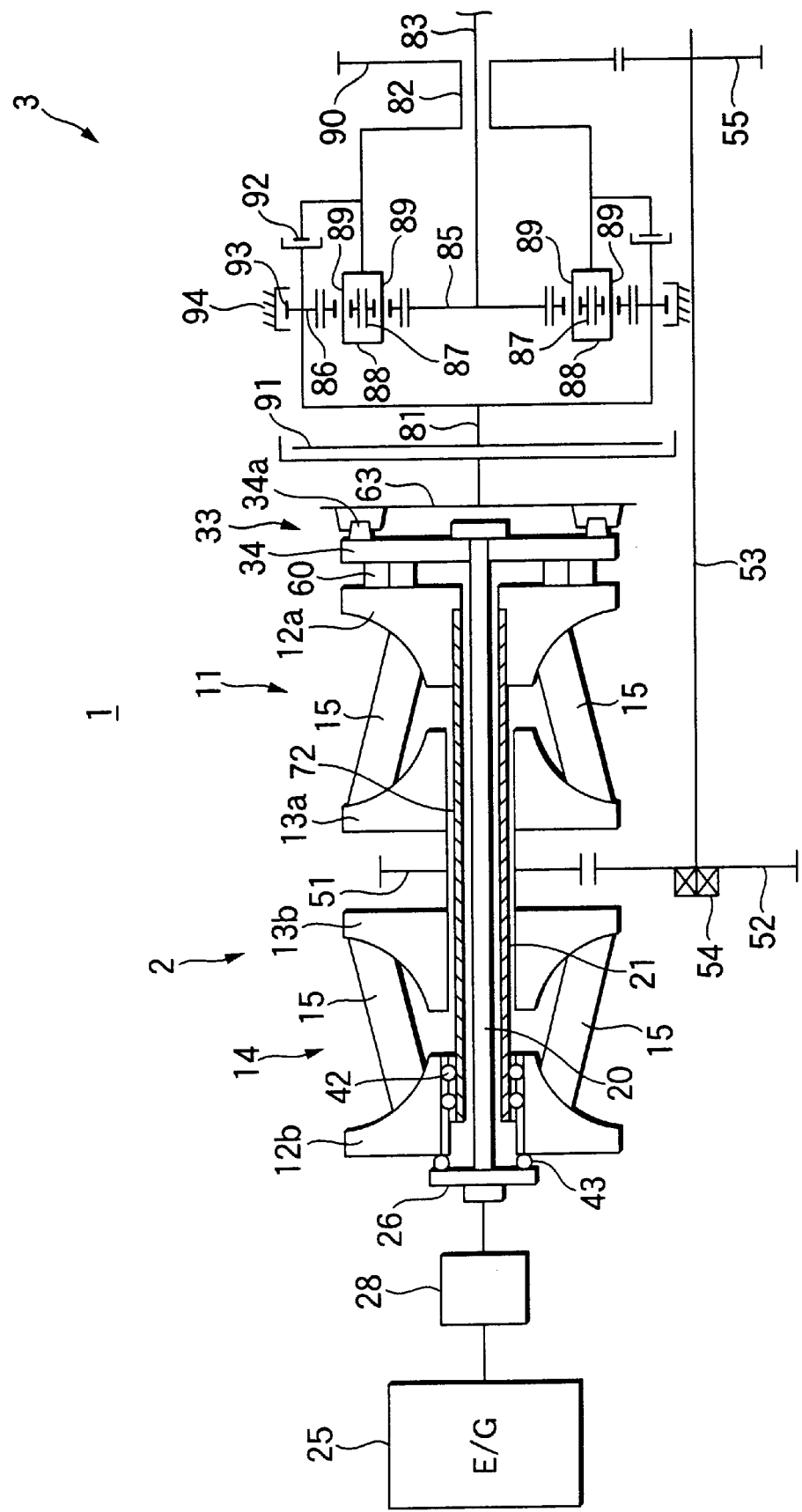
FIG. 2 is a schematic view of a continuously variable transmission apparatus including the toroidal-type continuously variable transmission shown in FIG. 1.

As shown in FIG. 1, of the whole length of the input shaft 20, in the portion thereof where the input shaft 20 does not penetrate through the hollow shaft 21 (in the no-penetrating portion 20c), there are formed a lubricating oil introduction hole 70, and oil holes 71, 71' which extend in the diameter direction of the input shaft 20. The oil holes 71, 71' are in communication with the lubricating oil introduction hole 70 as well as are opened on the outer peripheral surface of the non-penetrating portion 20c. Between the inner peripheral surface of the hollow shaft 21 and the outer peripheral surface of the portion (the penetrating portion 20d) of the whole length of the input shaft 20, which penetrates though the hollow shaft 21, there is formed an oil passage 72 for allowing lubricating oil to flow. The oil passage 72 is in communication with an opening 71a formed in the oil hole 71.

Figure 3:
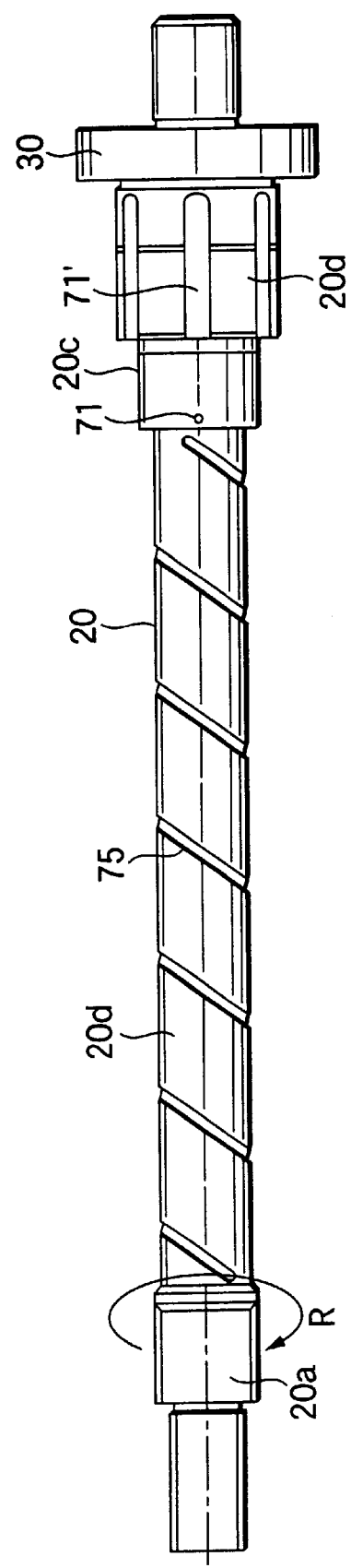
FIG. 3 is a side view of an input shaft used in the toroidal-type continuously variable transmission shown in FIG. 1.

The oil hole 72 includes such a spiral groove 75 as shown in FIG. 3. This spiral groove 75 is formed in such a manner that it draws a spiral extending in the opposite direction to the rotation direction R of the input shaft 20 from the end portion 20a of the input shaft 20, where the engine torque is input, to the torque transmitted side end portion 20b of the input shaft 20. That is, since the spiral groove 75 is formed in the direction where, when the engine torque is loaded into the input shaft 20, the tensile stress is generated, the input shaft 20 can withstand a large torque input. By the way, the section of the spiral groove 75 is formed, for example, in an arc shape.

In the hollow shaft 21, there are formed flow holes 76 which open in the vicinity of the portions to be lubricated such as the ball spline 42 and bearings 45, 46. Therefore, the lubricating oil, which flows out from the opening 71a of the oil hole 71 to the outer periphery side of the input shaft 20, is allowed to flow through the oil passage 72 and then flow from the flow holes 76 to the outer periphery side of the hollow shaft 21, and is then supplied to the portions to be lubricated such as the ball spline 42 and bearings 45, 46.

On the other hand, the planetary gear mechanism 3 is structured in the following manner. That is, the planetary gear mechanism 3 comprises a first rotary body 81 which can be rotated due to the torque of the input shaft 20, and a second rotary body 82 which can be rotated by the output disks 13a, 13b. On the extended axial line of the input shaft 20, there is disposed an output shaft 83. And, on the output shaft 83, there is disposed a sun gear 85. On the periphery of the sun gear 85, there is disposed a ring gear 86 in such a manner that it is concentric with the sun gear 85 and can be rotated independently of the sun gear 85. Between the inner peripheral surface of the ring gear 86 and the outer peripheral surface of the sun gear 85, there is interposed a planetary gear set 87 consisting of a pair of planetary gears which are in meshing engagement with each other.

One planetary gear forming the planetary gear set 87 is meshingly engaged with the ring gear 86, while the other planetary gear is meshingly engaged with the sun gear 85. The reason for use of the planetary gear set 87 consisting of a pair of planetary gears is to allow the rotation directions of the sun gear 85 and ring gear 86 to coincide with each other. In case where there is no need to coincide the rotation directions of the sun gear 85 and ring gear 86 with each other, a single planetary gear may be engaged with the sun gear 85 and ring gear 86.

The pair of planetary gears forming each planetary gear set 87 are rotatably supported by a pair of shafts 89 which are disposed on a carrier 88. The carrier 88 is disposed on one end side of the second rotary body 82. On the other end side of the second rotary body 82, there is disposed a gear 90 which can be rotated around the output shaft 83 integrally with the carrier 88. And, this gear 90 is in meshing engagement with the previously-mentioned relay gear 55.

A high-speed clutch 91 is interposed between the first rotary body 81 and linking member 63; and, a low-speed clutch 92 is interposed between the ring gear 86 and second rotary body 82. Also, a retreating clutch 93 is interposed between the ring gear 86 and a portion (fixed portion) 94 of the transmission case. These clutches 91, 92, 93 are structured such that, in case where any one of the clutches is connected, the remaining two clutches can be disconnected by a hydraulic control circuit or by an electric control circuit.

Next, description will be given below of the operation of the above-structured continuously variable transmission apparatus 1.

In the low-speed vehicle running time, the low-speed clutch 92 is connected, while the high-speed clutch 91 and retreating clutch 93 are disconnected respectively. In case where the input shaft 20 is rotated by the torque of the engine 25 in this low-speed mode, only the toroidal-type continuously variable transmission 2 transmits the engine torque to the output shaft 83 for the following reasons. That is, since, when the low-speed clutch 92 is connected, the sun gear 85 and ring gear 86 and carrier 88 are connected together, the sun gear 85 and ring gear 86 are prevented from rotating with respect to each other. Also, because the connection of the high-speed clutch 91 is cut, the ring gear 86 and carrier 88 are free to rotate integrally with each other.

Therefore, in case where the input shaft 20 is rotated in this state, the rotation of the input shaft 20 is transmitted through the loading cam mechanism 33 to the input disks 12a, 12b and is then transmitted through the power rollers 15 to the output disks 13a, 13b. The rotation movements of the output disks 13a, 13b rotate the carriers 88 through the output gear 51, relay shaft 53 and gear 90.

At the then time, since the sun gear 85, ring gear 86 and planetary gear set 87 are fixed to one another, the ring gear 86, carrier 88 and sun gear 85 are rotated together integrally, and the output shaft 83 is also rotated in the same direction. That is, in the low-speed vehicle running time, the torque of the engine 25 is transmitted to the output shaft 83 only through the toroidal-type continuously variable transmission 2. In this case, the gear change ratio can be varied continuously according to the inclination angles of the power roller 15.

In the high-speed vehicle running time, the high-speed clutch 91 is connected, whereas the low-speed clutch 92 and retreating clutch 93 are disconnected respectively. In this state, in case where the input shaft 20 is rotated by the torque of the engine 25, the rotation movement of the input shaft 20 is transmitted through the high-speed clutch 91 to the ring gear 86, and the rotation movement of the ring gear 86 is transmitted to the sun gear 85 through the movement of the planetary gear set 87 about its own axis, so that the output shaft 83 is rotated integrally with the sun gear 85. At the then time, the rotation movement of the output gear 51 is transmitted through the relay shaft 53 to the carrier 88 and the carrier 88 is thereby rotated around the sun gear 85, so that the rotation speed of the sun gear 85 is varied according to the rotation speed of the carrier 88. That is, by changing the rotation speed of the carrier 88 according to the gear change ratio of the toroidal-type continuously variable transmission 2, the gear change ratio of the output shaft 83 can be varied.

To rotate the output shaft 83 reversely so as to retreat the vehicle, the high-speed clutch 91 and low-speed clutch 92 are both disconnected and the retreating clutch 93 is connected, thereby fixing the ring gear 86. In this case, since the rotation movements of the output disks 13a, 13b are transmitted through the output gear 51 and relay shaft 53 to the carrier 88, the carrier 88 is rotated about the output shaft 83. As a result of this, the planetary gear set 87 is rotated about its own axis as well as is rotated around the sun gear 85, thereby rotating the output shaft 83 in the opposite direction to the advancing direction thereof in the vehicle advancing time.

Figure 4:
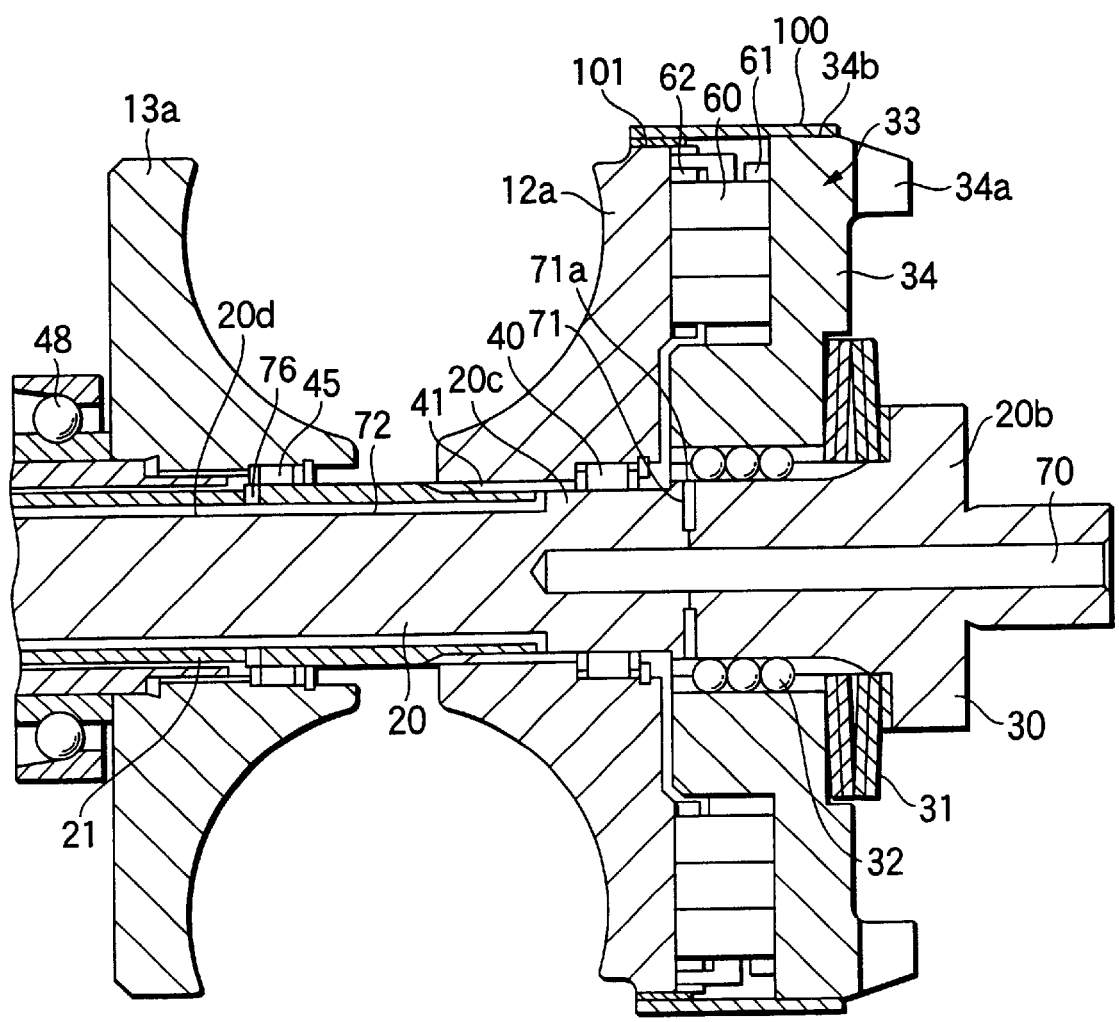
FIG. 4 is a section view of part of a toroidal-type continuously variable transmission according to a second embodiment of the invention; and, FIG. 5 is a schematic view of a continuously variable transmission apparatus according to a third embodiment of the invention.

Now, FIG. 4 shows a second embodiment of a toroidal-type continuously variable transmission according to the invention. In the present embodiment, the whole periphery of a clearance between the outer peripheral portion 34b of a cam disk 34 of a loading cam mechanism 33 and the outer peripheral portion of an input disk 12a is covered with a cover member 100. One end of the cover member 100 is fixed to the cam disk 34 and, a seal member 101 is interposed between the cover member 100 and input disk 12a. Lubricating oil, which is supplied from a lubricating oil introduction hole 70 into the loading cam mechanism 33, is confined to the interior of the cover member 100, thereby being able to prevent the lubricating oil from leaking from the loading cam mechanism 33 to the outside thereof.

Due to provision of the cover member 100 and seal member 101, a sufficient quantity of lubricating oil can be supplied to the portions to be lubricated such as bearings 40, 45 and ball splines. The structures and operation effects of the other parts of the second embodiment than the cover member 100 and seal member 101 are similar to those of the first embodiment. Therefore, the common parts in the first and second embodiments are given the common designations and thus the description thereof is omitted here.

Figure 5:
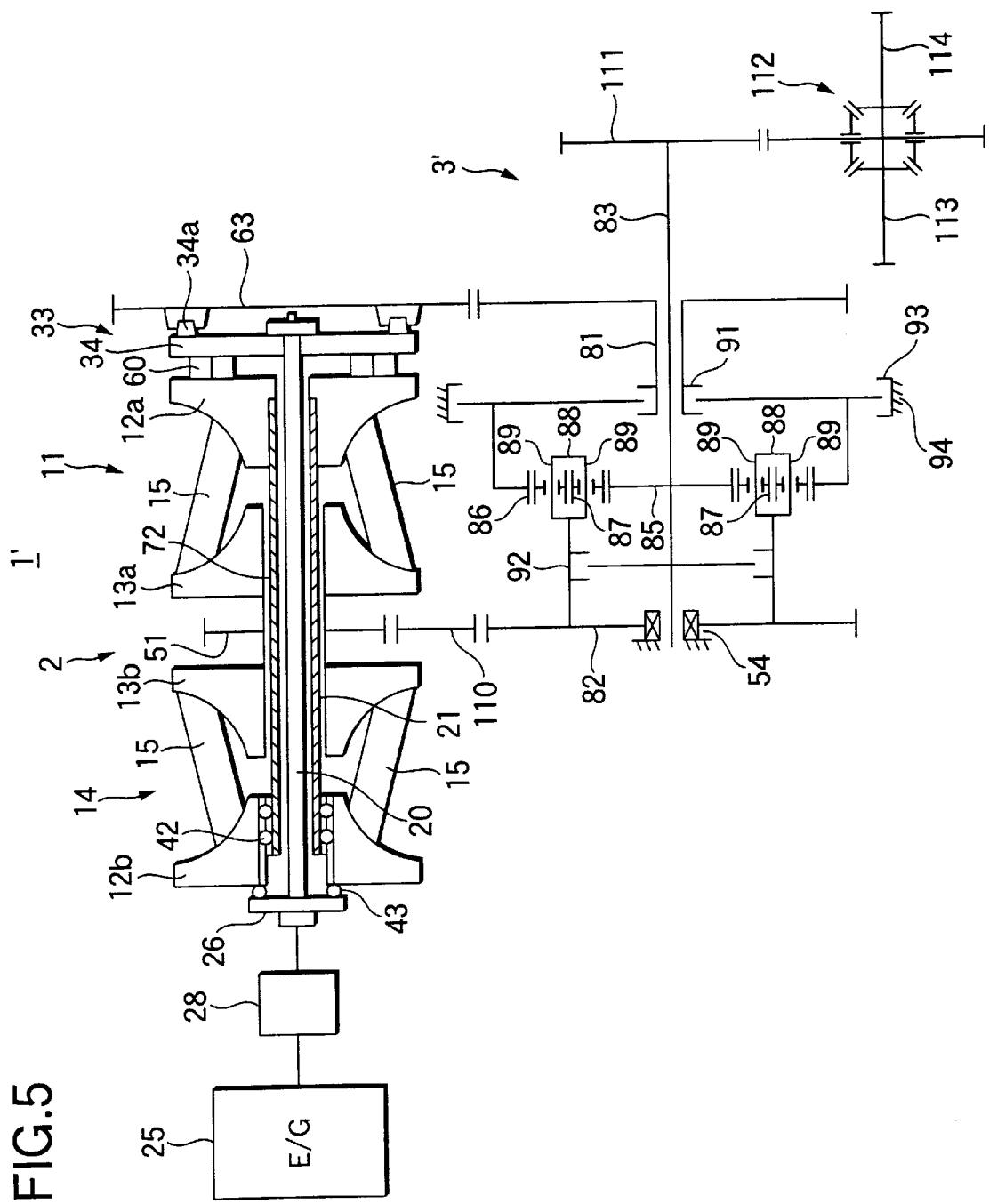

Now, FIG. 5 shows a third embodiment of the invention which is suitable for use in a vehicle of, for example, a front-engine/front-drive type. That is, in the third embodiment, there is shown a continuously variable transmission apparatus 1' which is a combination of a toroidal-type continuously variable transmission 2 with a planetary gear mechanism 3'. In the present embodiment, an output shaft 83 is disposed in such a manner that it extends in parallel to an input shaft 20. The structure of a toroidal-type continuously variable transmission 2 according to the present embodiment is similar to that of the first embodiment.

The present planetary gear mechanism 3' includes a linking member 63 rotatable integrally with the input shaft 20 and a first rotary body 81 rotatable integrally with the linking member 63. A high-speed clutch 91 is interposed between the first rotary body 81 and ring gear 86. A low-speed clutch 92 is interposed between the output shaft 83 and second rotary body 82. And, an intermediate gear 110 is interposed between the second rotary body 82 and output gear 51. The rotation movement of the output gear 51 is transmitted through the intermediate gear 110 to the second rotary body 82, thereby rotating carriers 88. The rotation movement of the output shaft 83 is input through a gear 111 to a known differential device 112, thereby rotating its left and right drive shafts 113, 114. The basic structure and operation of the present planetary gear mechanism 3' are similar to those of the planetary gear mechanism 3 according to the first embodiment. Therefore, the common parts in the two mechanisms 3 and 3' are given the same designations and thus the description thereof is omitted here.

While only certain embodiments of the invention have been specifically described herein, it will apparent that numerous modifications may be made thereto without departing from the spirit and scope of the invention.

Thus, according to the first aspect of the invention, in a continuously variable transmission apparatus which is capable of circulation of power using a combination of a toroidal-type continuously variable transmission with a planetary gear mechanism, by using a clearance between an input shaft and a hollow shaft as an oil passage, the portions to be lubricated such as bearings and ball splines can be lubricated to a sufficient degree to thereby be able to prevent the portions to be lubricated against seizure or prevent occurrence of inconveniences such as a flaking phenomenon. Also, since there can be eliminated the possibility that excessive stress concentration can occur in the input shaft, the fatigue failure of the input shaft can be prevented. Thanks to this, the durability of the input shaft can be enhanced, which makes it possible to realize stable torque transmission. And, since an oil passage is formed on the outer periphery side of the input shaft, an operation to form an oil passage can be facilitated.

Also, according to the second aspect of the invention, since there is formed a groove in the outer peripheral surface of the input shaft, the lubricating oil can be supplied smoothly to the portions to be lubricated. In this case, because the groove is formed only in the outer peripheral surface of the input shaft, occurrence of concentration of stresses can be controlled, thereby being able to avoid occurrence of an excessive stress. Also, since the hardness of the surface layer of the input shaft in which the groove is formed can be enhanced by a heat treatment, the fatigue limit of the input shaft can be enhanced. Also, because the groove is formed only in the surface of the input shaft, an operation to form the groove can be facilitated.

Further, according to the third aspect of the invention, since the tensile stress of the input shaft can be controlled so as to occur in the direction of the spiral groove in consideration of the direction of the torsional moment that is applied to the input shaft, the input shaft can be made more advantageous from the viewpoint of strength. Therefore, the fatigue strength of the input shaft can be enhanced and the groove can be formed with high efficiency using a lathe.

What is claimed is:

1. A continuously variable transmission apparatus including a combination of a toroidal-type continuously variable transmission with a planetary gear mechanism, said toroidal-type continuously variable transmission comprising:
   an input shaft transmitting power from an engine;
   a pair of input disks disposed in such a manner as to be spaced apart from each other in an axial direction of said input shaft;
   a pair of output disks interposed between said pair of input disks in such a manner as to be opposed to said respective input disks;
   a pressing mechanism pressing said input disk toward said output disk;
   a hollow shaft disposed around an outer periphery of said input shaft concentrically with said input shaft, and connecting said pair of input disks to each other,
   said input shaft defining an oil hole formed in a no-penetrating portion of said input shaft where said input shaft does not penetrate through said hollow shaft, and opened on an outer peripheral surface of said no-penetrating portion, and
   an oil passage being formed between an inner peripheral surface of said hollow shaft and an outer peripheral surface of a penetrating portion of said input shaft where said input shaft penetrates through said hollow shaft, wherein said oil passage is in communication with said oil hole, and further wherein said oil passage includes a groove formed in the outer peripheral surface of said input shaft and extending in the axial direction of said input shaft; and
   said planetary gear mechanism, comprising:
      a first rotary body rotatable by said input shaft;
      a second rotary body rotatable by said output disk; and,
      a clutch switching over the rotation movements of said first and second rotary bodies to any of an advancing side high speed mode, an advancing side low speed mode and a retreating mode to transmit the same to said output shaft.

2. The continuously variable transmission apparatus as set forth in claim 1, wherein said groove is a spiral groove drawing a spiral extending in the opposite direction to the rotation direction of said input shaft from a torque inputting side end portion of said input shaft toward a torque transmitting side end portion of said input shaft.

3. A continuously variable transmission apparatus including a combination of a toroidal-type continuously variable transmission with a planetary gear mechanism, said toroidal-type continuously variable transmission comprising:

an input shaft transmitting power from an engine;

a pair of input disks disposed in such a manner as to be spaced apart from each other in an axial direction of said input shaft;

a pair of output disks interposed between said pair of input disks in such a manner as to be opposed to said respective input disks;

a pressing mechanism pressing said input disk toward said output disk, wherein said pressing mechanism is a loading cam mechanism, and said loading cam mechanism includes a cam disk having a cam surface and a roller, wherein said cam disk includes an engaging portion on the opposite side to said cam surface, and wherein said transmission apparatus further comprises a linking member engageable with said engaging portion and rotatable integrally with said cam disk;

a hollow shaft disposed around an outer periphery of said input shaft concentrically with said input shaft, and connecting said pair of input disks to each other, said input shaft defining an oil hole formed in a no-penetrating portion of said input shaft where said input shaft does not penetrate through said hollow shaft, and opened on an outer peripheral surface of said no-penetrating portion, and an oil passage being formed between an inner peripheral surface of said hollow shaft and an outer peripheral surface of a penetrating portion of said input shaft where said input shaft penetrates through said hollow shaft, wherein said oil passage is in communication with said oil hole; and said planetary gear mechanism, comprising:
  a first rotary body rotatable by said input shaft;
  a second rotary body rotatable by said output disk;
  a clutch switching over the rotation movements of said first and second rotary bodies to any of an advancing side high speed mode, an advancing side low speed mode and a retreating mode to transmit the same to said output shaft
  a sun gear disposed on said output shaft;
  a ring gear disposed on the periphery of said sun gear concentrically with said sun gear and rotatable independently of said sun gear; and,
  a planetary gear set including a pair of planetary gears respectively interposed between the inner peripheral surface of said ring gear and the outer peripheral surface of said sun gear.

4. The continuously variable transmission apparatus as set forth in claim 3, wherein said planetary gear mechanism further includes:
  a high-speed clutch interposed between said first rotary body and said linking member for switching said rotation movement to said advancing side high speed mode;
  a low-speed clutch interposed between said ring gear and second rotary body for switching said rotation movement to said advancing side low speed mode; and,
  a retreating clutch interposed between said ring gear and a portion of a transmission case for switching said rotation movement to said retreating mode.

5. A continuously variable transmission apparatus including a combination of a toroidal-type continuously variable transmission with a planetary gear mechanism, said toroidal-type continuously variable transmission comprising:

an input shaft transmitting power from an engine;

an output shaft disposed in parallel to said input shaft;

a pair of input disks disposed in such a manner as to be spaced apart from each other in an axial direction of said input shaft;

a pair of output disks interposed between said pair of input disks in such a manner as to be opposed to said respective input disks;

a pressing mechanism pressing said input disk toward said output disk;

a hollow shaft disposed around an outer periphery of said input shaft concentrically with said input shaft, and connecting said pair of input disks to each other, said input shaft defining an oil hole formed in a no-penetrating portion of said input shaft where said input shaft does not penetrate through said hollow shaft, and opened on an outer peripheral surface of said no-penetrating portion, and an oil passage being formed between an inner peripheral surface of said hollow shaft and an outer peripheral surface of a penetrating portion of said input shaft where said input shaft penetrates through said hollow shaft; and said planetary gear mechanism, comprising:
  a linking member rotatable integrally with said input shaft;
  a first rotary body rotatable integrally with said linking member;
  a second rotary body rotatable by said output disk; and,
  a clutch for switching over the rotation movements of said first and second rotary bodies to any one of an advancing side high speed mode, an advancing side low speed mode and a retreating mode to transmit the same to said output shaft.

* * * * *